(12) United States Patent
Lee et al.

(10) Patent No.: US 10,566,167 B2
(45) Date of Patent: Feb. 18, 2020

(54) CARBON NANOTUBE ELECTRON EMITTER, METHOD OF MANUFACTURING THE SAME AND X-RAY SOURCE USING THE SAME

(71) Applicant: KOREA UNIVERSITY RESEARCH AND BUSINESS FOUNDATION, Seoul (KR)

(72) Inventors: Cheol Jin Lee, Seoul (KR); Sang Heon Lee, Seoul (KR); Jun-Soo Han, Uijeongbu-si (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/138,118

(22) Filed: Sep. 21, 2018

(65) Prior Publication Data

US 2019/0088437 A1 Mar. 21, 2019

(30) Foreign Application Priority Data

Sep. 21, 2017 (KR) .......................... 10-2017-0121577

(51) Int. Cl.
  *H01J 1/304* (2006.01)
  *C01B 32/15* (2017.01)
  *H01J 35/06* (2006.01)
  *H01J 9/02* (2006.01)

(52) U.S. Cl.
  CPC .............. *H01J 1/304* (2013.01); *C01B 32/15* (2017.08); *H01J 9/025* (2013.01); *H01J 35/065* (2013.01); *H01J 2201/30469* (2013.01)

(58) Field of Classification Search
  CPC ..................... H01J 1/304; H01J 35/065; H01J 2201/30469; C01B 32/15
  See application file for complete search history.

(56) References Cited

U.S. PATENT DOCUMENTS

| 2003/0090190 A1* | 5/2003 | Takai ..................... B82Y 10/00 313/311 |
| 2008/0170982 A1* | 7/2008 | Zhang .................... B82Y 10/00 423/447.3 |
| 2009/0153516 A1* | 6/2009 | Liu ......................... G06F 3/045 345/173 |

(Continued)

FOREIGN PATENT DOCUMENTS

| KR | 10-2011-0016289 A | 2/2011 |
| KR | 10-1239395 B1 | 3/2013 |

(Continued)

OTHER PUBLICATIONS

Shin, Dong Hoon, et al., "Point-Type Carbon Nanotube Field Emitters", *Technical Digest, 2015 28th International Vacuum Nanoelectronics Conferernce*, Jul. 2015, Guangzhou, China (2 pages in English).

*Primary Examiner* — Donald L Raleigh
(74) *Attorney, Agent, or Firm* — NSIP Law

(57) ABSTRACT

The present disclosure provides a method of manufacturing a carbon nanotube electron emitter, including: forming a carbon nanotube film; performing densification by dipping the carbon nanotube film in a solvent; cutting an area of the carbon nanotube film into a pointed shape or a line shape; and fixing the cutting area of the carbon nanotube film arranged between at least two metal members to face upwards with lateral pressure.

11 Claims, 11 Drawing Sheets

(56) References Cited

U.S. PATENT DOCUMENTS

| | | | |
|---|---|---|---|
| 2010/0316792 A1* | 12/2010 | Lee | H01J 1/304 |
| | | | 427/77 |
| 2011/0212308 A1* | 9/2011 | Brown | C04B 14/026 |
| | | | 428/195.1 |
| 2012/0267581 A1* | 10/2012 | Cai | H01B 1/24 |
| | | | 252/510 |
| 2014/0004768 A1* | 1/2014 | Liu | H01J 9/025 |
| | | | 445/51 |
| 2014/0117548 A1* | 5/2014 | Katagiri | H01L 23/53276 |
| | | | 257/751 |
| 2016/0027934 A1* | 1/2016 | Noyes | H01G 11/36 |
| | | | 429/231.8 |
| 2019/0039904 A1* | 2/2019 | Fujimoto | D02G 3/16 |

FOREIGN PATENT DOCUMENTS

| | | |
|---|---|---|
| KR | 10-1371289 B1 | 3/2014 |
| KR | 10-2017-0089387 A | 8/2017 |

* cited by examiner

Point-type CNT film emitter

Line-type CNT film emitter

US 10,566,167 B2

CARBON NANOTUBE ELECTRON EMITTER, METHOD OF MANUFACTURING THE SAME AND X-RAY SOURCE USING THE SAME

CROSS-REFERENCE TO RELATED APPLICATION

This application claims the benefit under 35 USC 119(a) of Korean Patent Application No. 10-2017-0121577 filed on Sep. 21, 2017 in the Korean Intellectual Property Office, the entire disclosures of which are incorporated herein by reference for all purposes.

TECHNICAL FIELD

The present disclosure relates to a carbon nanotube electron emitter, a method of manufacturing the same, and an X-ray source using the same.

BACKGROUND

In general, a cold cathode X-ray source attracts electron beams from a carbon nanotube electron emitter by applying a voltage to a gate electrode and then focuses the electron beams to high density through a focusing electrode and induces them to an anode electrode. In this case, if a high voltage is applied between a cathode electrode and an anode electrode, electrons are accelerated toward the anode electrode and collide with the anode electrode, and, thus, an X-ray is generated from the anode electrode.

According to the conventional cold cathode electron emission technology, a carbon nanotube has mainly been used as an electron emitter and an electron emitter has been manufactured by mixing the carbon nanotube and a conductive organic material to a paste. However, while the carbon nanotube paste electron emitter is manufactured, the carbon nanotube which serves as a field emitter can be contaminated by unwanted organic material and it is very difficult to achieve vertical orientation. Further, while the carbon nanotube paste electron emitter is operated, the field emission efficiency is greatly decreased due to the ionization of gas molecules caused by the organic material remaining in the paste and the lifetime of the carbon nanotube that emits electrons is reduced.

Further, in a conventional cold cathode X-ray source, a metal mesh or metal hole has mainly been used as a gate electrode. In this case, the transmission efficiency of electrons passing through the gate electrode is decreased.

In this regard, Korean Patent No. 10-1239395 (entitled "Field emission source, device adopting the source, and fabrication method of the device") discloses a field emission source having a stable electron emission material support structure, a field emission device adopting the field emission source, and a fabrication method of the field emission device.

SUMMARY

In view of the foregoing, the present disclosure provides a carbon nanotube electron emitter in which a carbon nanotube film is densified or carbonized to improve the stability of the carbon nanotube film used as an electron emitter, a method of manufacturing the carbon nanotube electron emitter, and an X-ray source using the carbon nanotube electron emitter.

Further, the present disclosure provides an X-ray source in which graphene is arranged in a gate electrode to increase the electron transmission efficiency and improve the transmission linearity of electron beam.

However, problems to be solved by the present disclosure are not limited to the above-described problems. There may be other problems to be solved by the present disclosure.

According to an aspect of the present disclosure, a method of manufacturing a carbon nanotube electron emitter includes: forming a carbon nanotube film; performing densification by dipping the carbon nanotube film in a solvent; cutting an area of the carbon nanotube film into a pointed shape or a line shape; and fixing the cutting area of the carbon nanotube film arranged between at least two metal members to face upwards with lateral pressure.

Further, according to another aspect of the present disclosure, a method of manufacturing a carbon nanotube electron emitter includes: forming a carbon nanotube film; cutting an area of the carbon nanotube film into a pointed shape or a line shape; performing densification by dipping the cut carbon nanotube film in a solvent; and fixing the cutting area of the carbon nanotube film arranged between at least two metal members to face upwards with lateral pressure.

Further, according to yet another aspect of the present disclosure, a method of manufacturing a carbon nanotube electron emitter includes: forming a carbon nanotube film; performing carbonization by adding a carbon-based material into the carbon nanotube film and then performing heat treatment thereto; cutting an area of the carbon nanotube film into a pointed shape or a line shape; and fixing the cutting area of the carbon nanotube film arranged between at least two metal members to face upwards with lateral pressure.

According to still another aspect of the present disclosure, a carbon nanotube electron emitter includes: a carbon nanotube film which is densified with a solvent or carbonized by adding a carbon-based material; and at least two metal members arranged on respective sides of the carbon nanotube film and fixing the carbon nanotube film.

According to still another aspect of the present disclosure, an X-ray source using a carbon nanotube electron emitter includes: a cathode electrode; an anode electrode arranged above the cathode electrode to face the cathode electrode; a carbon nanotube electron emitter formed on the cathode electrode; a gate electrode arranged between the cathode electrode and the anode electrode and arranged corresponding to the carbon nanotube electron emitter; a focusing lens arranged between the gate electrode and the anode electrode; and a getter arranged under the cathode electrode. The carbon nanotube electron emitter includes: a carbon nanotube film which is densified with a solvent or carbonized by adding a carbon-based material; and at least two metal members arranged on respective sides of the carbon nanotube film and fixing the carbon nanotube film.

Further, according to still another aspect of the present disclosure, an X-ray source using a gate electrode in which graphene is arranged includes: a cathode electrode; an anode electrode arranged above the cathode electrode to face the cathode electrode; a carbon nanotube electron emitter formed on the cathode electrode; a gate electrode arranged between the cathode electrode and the anode electrode and arranged corresponding to the carbon nanotube electron emitter; a focusing lens arranged between the gate electrode and the anode electrode; and a getter arranged under the cathode electrode. In the gate electrode, graphene is arranged.

According to the method of manufacturing a carbon nanotube electron emitter of the present disclosure, it is possible to achieve high bonding strength within a nanomaterial and high adhesion between a nanomaterial thin-film emitter and an electrode without a paste containing an organic material or other adhesives. Thus, it is possible to solve the generation of ions caused by an organic material. Therefore, it is possible to manufacture an X-ray source with high field emission efficiency and excellent lifetime.

Further, with the gate electrode in which graphene is arranged according to the present disclosure, it is possible to improve the transmittance of electron beam through the gate electrode and the linearity of electron beam. Therefore, it is possible to obtain an electron beam focusing effect in the anode electrode.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 1A illustrates a carbon nanotube film which is densified or carbonized by adding a carbon-based material, FIG. 1B shows metal members arranged on respective sides of carbon nanotube films, and FIG. 1C illustrates a carbon nanotube electron emitter in which the carbon nanotube films are fixed using the metal members.

FIG. 2A shows an SEM image of a surface of a carbon nanotube film, FIG. 2B shows a carbon nanotube film filtered on an AAO membrane, and FIG. 2C shows the carbon nanotube film with the AAO membrane.

FIG. 3A shows a carbon nanotube film which is densified or carbonized by adding a carbon-based material, FIG. 3B shows metal members arranged on respective sides of a carbon nanotube film cut into a pointed shape, and FIG. 3C illustrates a carbon nanotube electron emitter in which the carbon nanotube film is fixed using the metal members. FIG. 3D shows a carbon nanotube film which is densified or carbonized by adding a carbon-based material, FIG. 3E shows metal members arranged on respective sides of a carbon nanotube film cut into a line shape, and FIG. 3F illustrates a carbon nanotube electron emitter in which the carbon nanotube film is fixed using the metal members.

FIG. 6A shows that a layer of graphene is arranged on a metal plate and FIG. 6B shows a gate electrode according to FIG. 6A. FIG. 6C shows that multiple layers of graphene are arranged on a metal plate and FIG. 6D shows a gate electrode according to FIG. 6C.

FIG. 7A shows that a layer of graphene is arranged between metal plates and FIG. 7B shows a gate electrode according to FIG. 7A.

DETAILED DESCRIPTION

Figure 1A:
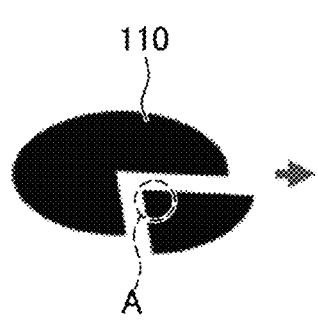
FIG. 1A to FIG. 1C are diagrams provided to explain a carbon nanotube electron emitter in accordance with various embodiments described herein, and specifically.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "step of" does not mean "step for".

Through the whole document, the term "on" that is used to designate a position of one element with respect to another element includes both a case that the one element is adjacent to the other element and a case that any other element exists between these two elements.

Figure 1B:
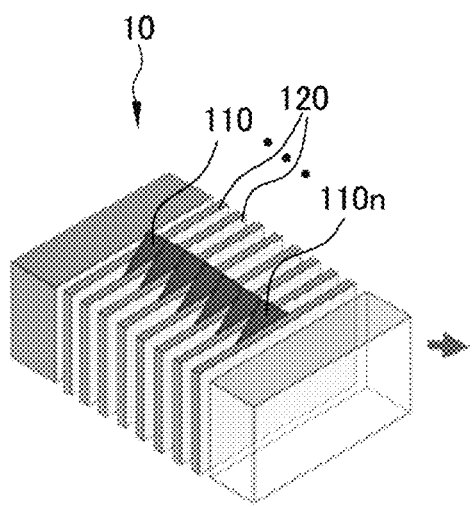
Figure 1C:
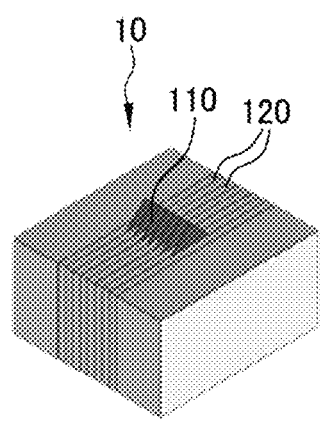

FIG. 1A to FIG. 1C are diagrams provided to explain a carbon nanotube electron emitter in accordance with an embodiment of the present disclosure, and specifically, FIG.

1A illustrates a carbon nanotube film which is densified or carbonized by adding a carbon-based material, FIG. 1B shows metal members arranged on respective sides of carbon nanotube films, and FIG. 1C illustrates a carbon nanotube electron emitter in which the carbon nanotube films are fixed using the metal members.

Figure 2A:
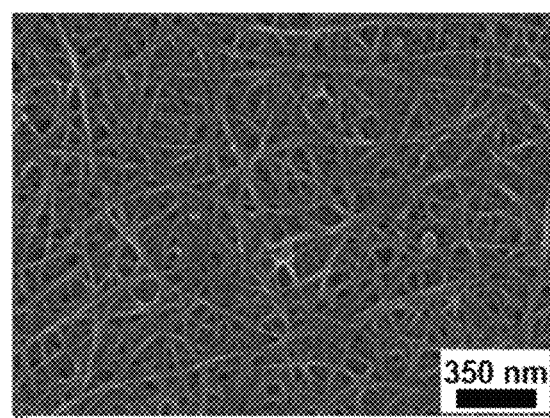
FIG. 2A to FIG. 2C are diagrams showing a surface of a densified carbon nanotube film manufactured by a method of manufacturing a carbon nanotube electron emitter and analyzed by scanning electron microscopy (SEM) in accordance with various embodiments described herein, and specifically.
Figure 2B:
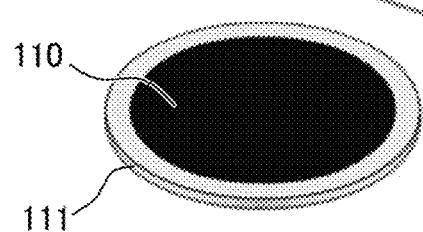
Figure 2C:
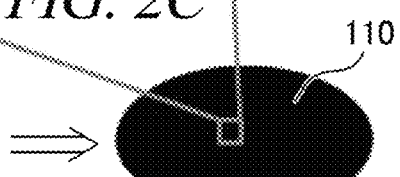

FIG. 2A to FIG. 2C are diagrams showing a surface of a densified carbon nanotube film manufactured by a method of manufacturing a carbon nanotube electron emitter and analyzed by scanning electron microscopy (SEM) in accordance with an embodiment of the present disclosure, and specifically, FIG. 2A shows an SEM image of a surface of a carbon nanotube film, FIG. 2B shows a carbon nanotube film filtered on an AAO membrane, and FIG. 2C shows the carbon nanotube film with the AAO membrane.

Referring to FIG. 1A to FIG. 1C, a carbon nanotube electron emitter 10 of the present disclosure includes a carbon nanotube film 110 which is densified with a solvent or carbonized by adding a carbon-based material and at least two metal members 120 arranged on respective sides of the carbon nanotube film 110 and fixing the carbon nanotube film 110.

Herein, the solvent includes at least any one of isopropyl alcohol (IPA), ethanol, and nitric acid. The densified carbon nanotube film 110 has been dipped in a solvent and then dried. In the densified carbon nanotube film 110, a space between carbon nanotubes is reduced by removing sodium dodecyl sulfate (SDS) used as a dispersant remaining between the carbon nanotubes, and, thus, bonding strength between the carbon nanotubes is increased.

FIG. 2A is an SEM image of a surface of the densified carbon nanotube film 110 and shows carbon nanotubes densely entangled, forming a network.

Further, the carbon-based material includes at least one of graphite adhesive, carbon paste, and carbon nanotube (CNT) paste. The carbonized carbon nanotube film 110 is prepared by performing heat treatment to the carbon-based material-added carbon nanotube film 110 at a high temperature in a vacuum for a predetermined period of time. In the carbonized carbon nanotube film 110, the added carbon-based material fills a space between carbon nanotubes, and, thus, bonding strength between the carbon nanotubes is increased.

Details of a method of manufacturing the densified or carbonized carbon nanotube film 110 will be described later with reference to FIG. 8 to FIG. 11.

Figure 3A:
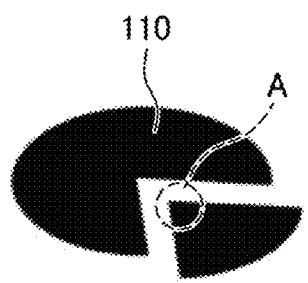
FIG. 3A to FIG. 3C are diagrams showing an example of a metal member depending on a cutting area of a carbon nanotube film in accordance with various embodiments described herein, and specifically.
Figure 3B:
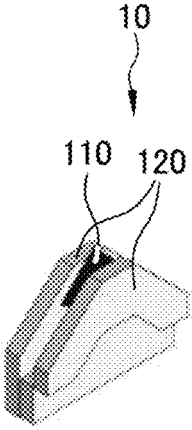
Figure 3C:
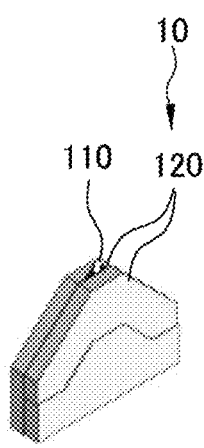
Figure 3D:
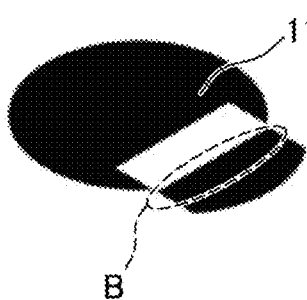
FIG. 3D to FIG. 3F are diagrams showing an example of a metal member depending on a cutting area of a carbon nanotube film in accordance with various embodiments described herein, and specifically.
Figure 3E:
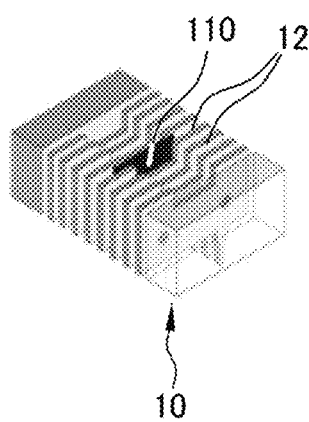
Figure 3F:
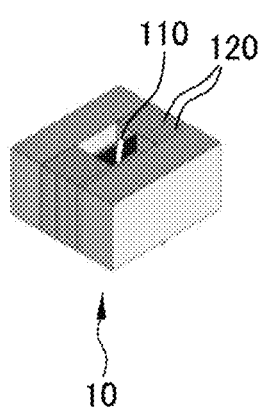

FIG. 3A to FIG. 3C are diagrams showing an example of a metal member depending on a cutting area of a carbon nanotube film in accordance with an embodiment of the present disclosure, and specifically, FIG. 3A shows a carbon nanotube film which is densified or carbonized by adding a carbon-based material, FIG. 3B shows metal members arranged on respective sides of a carbon nanotube film cut into a pointed shape, and FIG. 3C illustrates a carbon nanotube electron emitter in which the carbon nanotube film is fixed using the metal members. FIG. 3D to FIG. 3F are diagrams showing an example of a metal member depending on a cutting area of a carbon nanotube film in accordance with another embodiment of the present disclosure, and specifically, FIG. 3D shows a carbon nanotube film which is densified or carbonized by adding a carbon-based material, FIG. 3E shows metal members arranged on respective sides of a carbon nanotube film cut into a line shape, and FIG. 3F illustrates a carbon nanotube electron emitter in which the carbon nanotube film is fixed using the metal members.

Figure 4A:
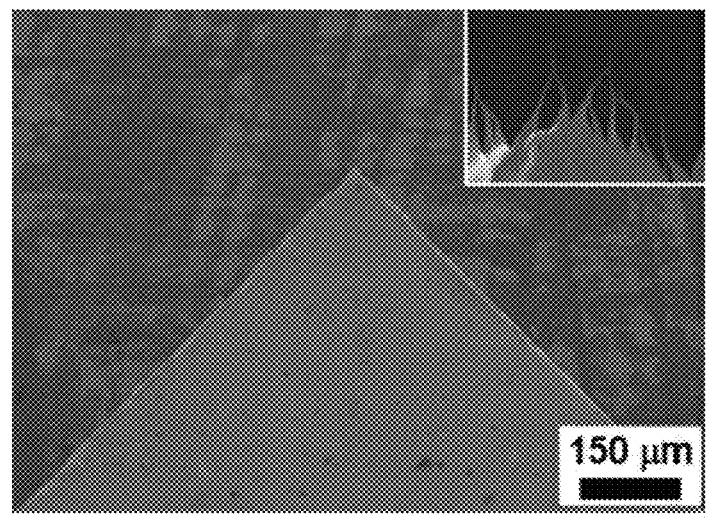
FIG. 4A shows an SEM image of the cutting area of the carbon nanotube film illustrated in FIG. 3A.
Figure 4B:
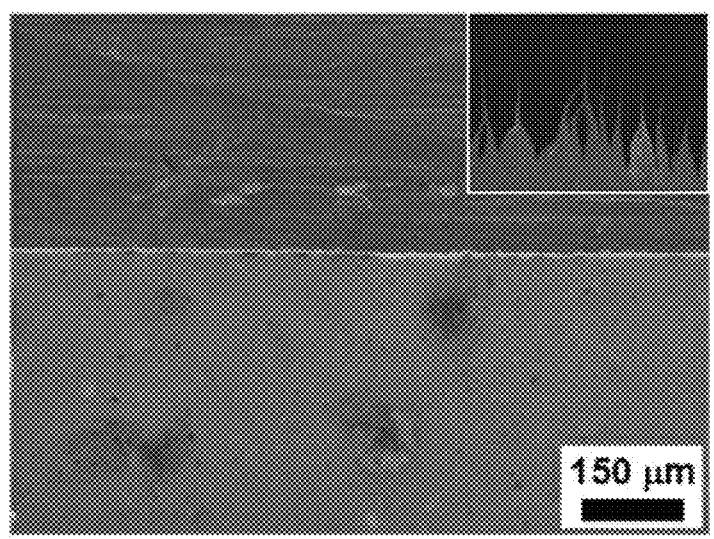
FIG. 4B shows an SEM image of the cutting area of the carbon nanotube film illustrated in FIG. 3D.

FIG. 4A shows an SEM image of the cutting area of the carbon nanotube film illustrated in FIG. 3A. FIG. 4B shows an SEM image of the cutting area of the carbon nanotube film illustrated in FIG. 3D.

Referring to FIG. 1A to FIG. 1C and FIG. 3A to FIG. 3F, the metal members 120 include at least two metal members 120 arranged on respective sides of the carbon nanotube film 110 and fixing the carbon nanotube film 110. For example, the metal members 120 fix the carbon nanotube film 110 in an upright position, and if parts of the metal members 120 are electrically connected to the carbon nanotube film 110, the shape of the metal members 120 can be changed in various ways.

As shown in FIG. 3A to FIG. 3F, an area of the carbon nanotube film 110 may be cut into a pointed shape A or a line shape B. Herein, the metal members 120 function to fix the cutting area A or B of the carbon nanotube film 110 to face upwards with lateral pressure.

For example, referring to FIG. 3A to FIG. 3C, a part of the cutting area A of the carbon nanotube film 110 cut into the pointed shape may be exposed to face upwards within an upper vertex area of the triangular metal members 120. That is, the carbon nanotube film 110 may be arranged to have the cutting area A facing upwards and fixed within the upper vertex area of the triangular metal members 120. Herein, the pointed cutting area A may refer to a part of a surface within the circumference of the carbon nanotube film 110.

For another example, referring to FIG. 3D to FIG. 3F, if the carbon nanotube film 110 is cut into the line shape B, upper surfaces of the respective metal members 120 may have at least one dented area 125 and both sides of the carbon nanotube film 110 may be exposed partially within the dented area 125. That is, the carbon nanotube film 110 may be arranged to have the cutting area B facing upwards and fixed within the dented area 125 of the metal members 120. Herein, the line-shaped cutting area B may refer to a part of a surface within the circumference of the carbon nanotube film 110.

FIG. 4A shows an SEM image of a surface of the carbon nanotube film 110 having the pointed cutting area A illustrated in FIG. 3A. Further, FIG. 4B shows an SEM image of a surface of the carbon nanotube film 110 having the line-shaped cutting area B illustrated in FIG. 3D. Herein, the carbon nanotube film 110 is densified or carbonized, and, thus, bonding strength between carbon nanotubes is increased. Therefore, it is possible to suppress disentanglement or separation of carbon nanotubes located in a tip portion of the carbon nanotube electron emitter 10. Accordingly, it is possible to suppress damage to the carbon nanotube electron emitter 10 in a performance limit test.

Further, in the carbon nanotube electron emitter 10 of the present disclosure, multiple carbon nanotube films 110 are arranged in an array type and the metal member 120 is arranged between the carbon nanotube films 110. The array-type carbon nanotube electron emitter 10 has a higher output current per supply voltage than a single-type carbon nanotube electron emitter 10.

For example, referring to FIG. 1A to FIG. 1C, the cutting areas A of the multiple carbon nanotube films 110 cut into the pointed shape A are arranged in an array type to face upwards between the metal members 120 and may be exposed partially through the upper side of the metal members 120. That is, each carbon nanotube film 110 is arranged to have the cutting area A facing upwards and fixed such that a part of the cutting area A is exposed through the upper side of each metal member 120. Herein, if lateral pressure is applied to the metal members 120 arranged on both ends among the multiple metal members 120 toward the carbon nanotube films 110, the metal members 120 and the carbon nanotube films 110 can adhere to each other.

Hereinafter, an X-ray source using the carbon nanotube electron emitter 10 of the present disclosure will be described in detail. An explanation of components that perform the same functions as the respective components illustrated in FIG. 1A to FIG. 4B will not be provided.

Figure 5:
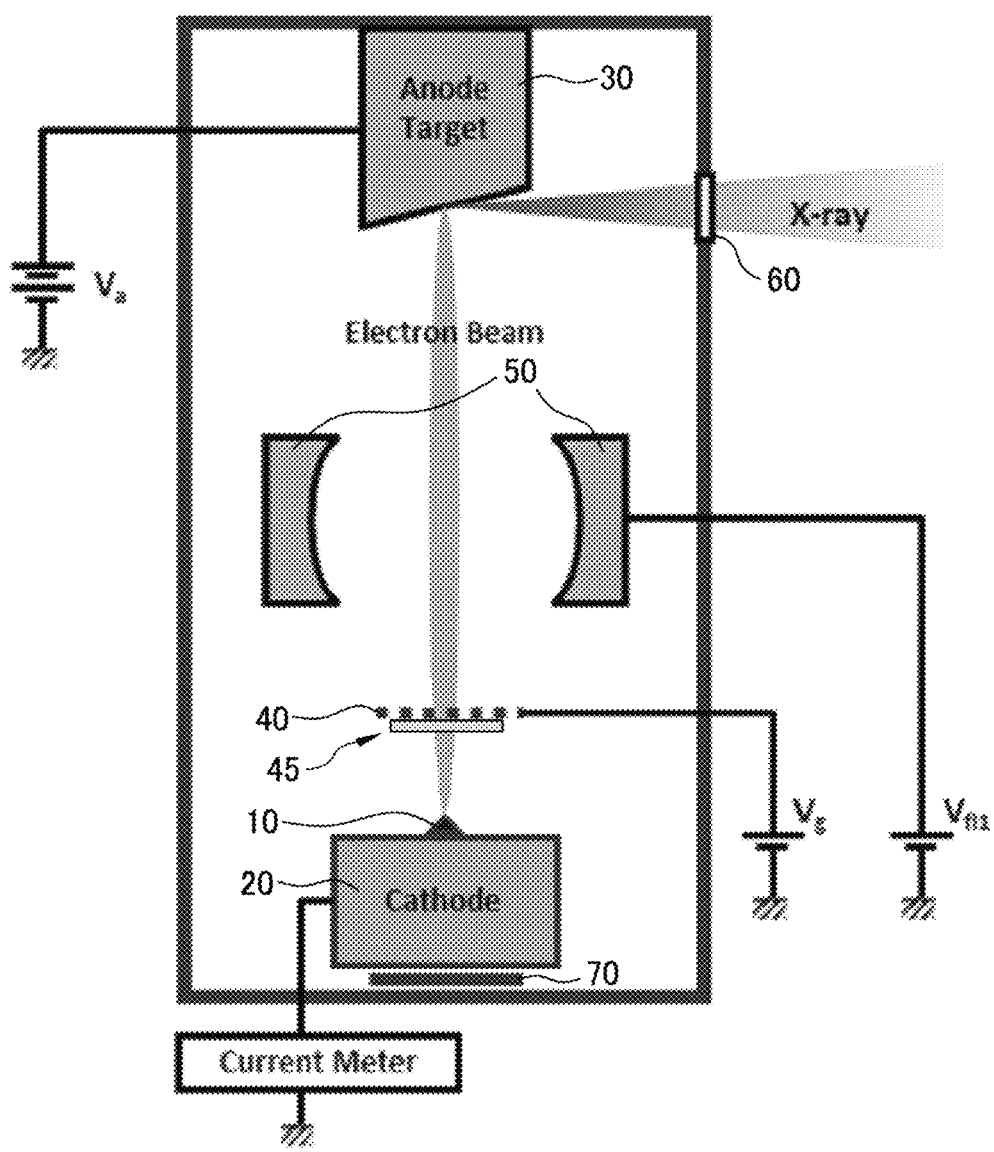
FIG. 5 is a cross-sectional view illustrating a structure of an X-ray source using a carbon nanotube electron emitter in accordance with various embodiments described herein.

FIG. 5 is a cross-sectional view illustrating a structure of an X-ray source using a carbon nanotube electron emitter in accordance with an embodiment of the present disclosure.

Referring to FIG. 5, an X-ray source using a carbon nanotube electron emitter of the present disclosure includes a cathode electrode 20, an anode electrode 30 arranged above the cathode electrode 20 to face the cathode electrode 20, the carbon nanotube electron emitter 10 formed on the cathode electrode 20, a gate electrode 40 arranged between the cathode electrode 20 and the anode electrode 30 and arranged corresponding to the carbon nanotube electron emitter 10, a focusing lens 50 arranged between the gate electrode 40 and the anode electrode 30, and a getter 70 arranged under the cathode electrode 20.

Herein, the carbon nanotube electron emitter 10 includes a carbon nanotube film 110 which is densified with a solvent or carbonized by adding a carbon-based material, and at least two metal members 120 arranged on respective sides of the carbon nanotube film 110 and fixing the carbon nanotube film 110.

The X-ray source of the present disclosure has a structure in which electrons emitted from the carbon nanotube electron emitter 10 due to a voltage difference between the cathode electrode 20 and the anode electrode 30 collide with a target surface of the anode electrode 30, and, thus, an X-ray is emitted through a window 60 of the body.

Herein, the body forms the exterior of the X-ray source, and the window 60 through which an X-ray emitted from the target surface of the anode electrode 30 is irradiated to the outside may be formed in a part of a lateral surface of the body. The body has a tube shape surrounding the outsides of the carbon nanotube electron emitter 10, the cathode electrode 20, the anode electrode 30, and the gate electrode 40 in which graphene 45 is arranged and thus defines a vacuum area separated from the outside. For example, the target surface may be formed of tungsten (W) and the window 60 may be formed of beryllium (Be), but may not be limited thereto.

Further, the cathode electrode 20 and the anode electrode 30 are arranged to face each other, and the anode electrode 30 and the cathode electrode 20 may be arranged above the cathode electrode 20 at a predetermined distance from the cathode electrode 20. A lower surface of the anode electrode 30, i.e., a surface facing the cathode electrode 20, may be slanted at a predetermined angle.

The anode electrode 30 may have one surface facing the inside of the body as a target surface with which electrons emitted from the carbon nanotube electron emitter 10 collide.

The carbon nanotube electron emitter 10 is formed on the cathode electrode 20. For example, in the carbon nanotube electron emitter 10, multiple carbon nanotube films 110 are arranged in an array type and the metal member 120 is arranged between the carbon nanotube films 110.

The gate electrode 40 is arranged above the cathode electrode 20 and may include an opening (e.g., in the form of a hole) at a position corresponding to the carbon nanotube electron emitter 10. Further, if the array-type carbon nanotube electron emitter 10 is formed on the cathode electrode 20, the gate electrode 40 includes multiple openings (e.g., in the form of a mesh).

For example, the gate electrode 40 includes a metal plate formed into one or more holes or a mesh and one or more layers of graphene 45 arranged on the metal plate. For another example, the gate electrode 40 is formed including the graphene 45 between upper and lower metal plates. In this case, the graphene 45 arranged in the gate electrode 40 can increase the focusing rate and the transmittance of electron beams. That is, the X-ray source of the present disclosure increases the focusing rate and the transmittance of electron beams by using the graphene 45, and, thus, the number of focusing lens can be reduced or removed. as compared with a conventional thermal electron emission. The structure of the gate electrode 40 will be described in detail with reference to FIG. 6A to FIG. 7B.

Meanwhile, referring to FIG. 5, the X-ray source of the present disclosure may include the focusing lens 50 between the gate electrode 40 and the anode electrode 30. The focusing lens 50 functions to focus electron beams emitted from the carbon nanotube electron emitter 10. For example, the focusing lens 50 may be arranged between the gate electrode 40 and the anode electrode 30.

Hereinafter, the X-ray source using the gate electrode 40 in which graphene is arranged according to the present disclosure will be described in detail. An explanation of components that perform the same functions as the respective components illustrated in FIG. 5 will not be provided.

Figure 6A:
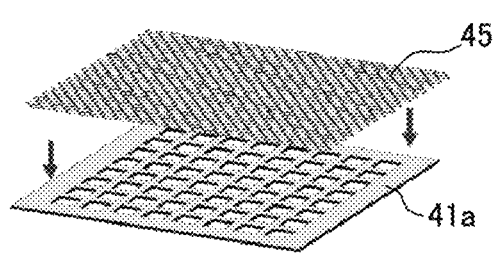
FIG. 6A and FIG. 6B are diagrams provided to explain a structure of a gate electrode in which graphene is arranged in accordance with various embodiments described herein, and specifically.
Figure 6B:
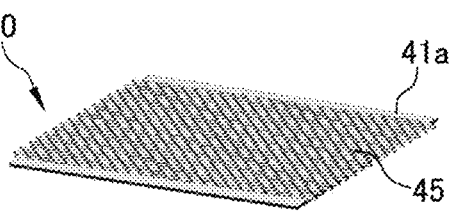
Figure 6C:
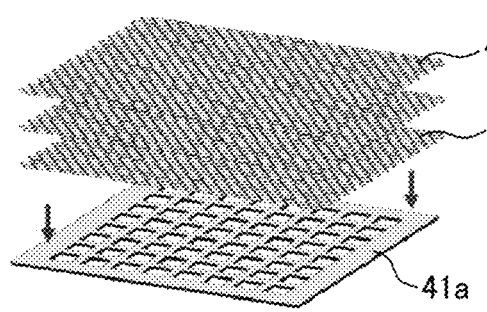
FIG. 6C and FIG. 6D are diagrams provided to explain a structure of a gate electrode in which graphene is arranged in accordance with various embodiments described herein, and specifically.
Figure 6D:
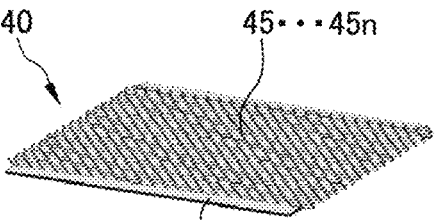

FIG. 6A and FIG. 6B are diagrams provided to explain a structure of a gate electrode in which graphene is arranged in accordance with an embodiment of the present disclosure, and specifically, FIG. 6A shows that a layer of graphene is arranged on a metal plate and FIG. 6B shows a gate electrode according to FIG. 6A. FIG. 6C and FIG. 6D are diagrams provided to explain a structure of a gate electrode in which graphene is arranged in accordance with another embodiment of the present disclosure, and specifically, FIG. 6C shows that multiple layers of graphene are arranged on a metal plate and FIG. 6D shows a gate electrode according to FIG. 6C.

Figure 7A:
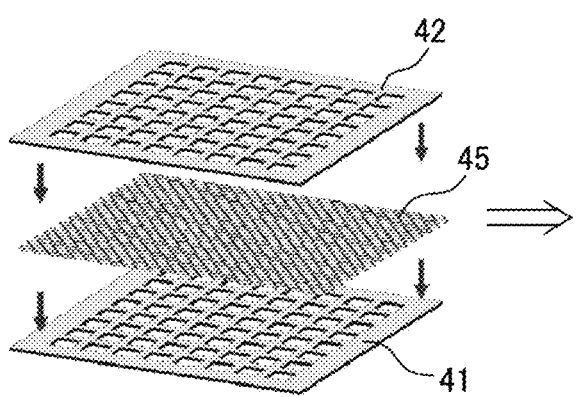
FIG. 7A and FIG. 7B are diagrams provided to explain a structure of a gate electrode in which graphene is arranged in accordance with various embodiments described herein, and specifically.
Figure 7B:
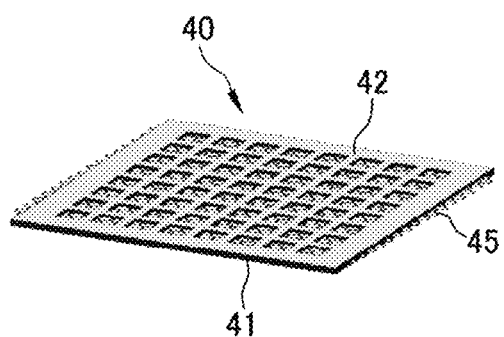

FIG. 7A and FIG. 7B are diagrams provided to explain a structure of a gate electrode in which graphene is arranged in accordance with another embodiment of the present disclosure, and specifically, FIG. 7A shows that a layer of graphene is arranged between metal plates and FIG. 7B shows a gate electrode according to FIG. 7A.

Referring to FIG. 5, the X-ray source using the gate electrode in which graphene is arranged according to another embodiment of the present disclosure includes the cathode electrode 20, the anode electrode 30 arranged above the cathode electrode 20 to face the cathode electrode 20, the carbon nanotube electron emitter 10 formed on the cathode electrode 20, and the gate electrode 40 arranged between the cathode electrode 20 and the anode electrode 30 and arranged corresponding to the carbon nanotube electron emitter 10. Herein, the gate electrode 40 whose upper surface was transferred with the graphene 45 is disposed as turned upside down.

Referring to FIG. 6A to FIG. 6D, the gate electrode 40 includes a metal plate 41a formed into one or more holes or a mesh and one or more layers of graphene 45 arranged on the metal plate 41a. Herein, the graphene 45 may be formed as a single layer, a double layer, or may include at least one selected from them to overlap with each other.

For example, as illustrated in FIG. 6A and FIG. 6B, in the gate electrode 40, the graphene 45 may be transferred onto the metal plate 41a formed into a mesh by a dry transfer method or a wet transfer method. Then, as illustrated in FIG. 5, if the X-ray source is arranged, the gate electrode 40 to which the graphene 45 is attached may be disposed as turned upside down. Further, as illustrated in FIG. 6C and FIG. 6D, in the gate electrode 40, multiple single layers, double layers, or multilayers of the graphene 45 may be arranged overlapping with each other on the metal plate 41a formed into a mesh. Further, as the number of layers of the transferred graphene 45 is increased, the transmittance and the focusing rate may be decreased but the mechanical stability may be improved. Herein, the graphene 45 has very high bonding strength with the metal plate 41a, and, thus, a member for supporting the graphene 45 may be omitted.

Referring to FIG. 7A and FIG. 7B, the gate electrode 40 formed into a hole or a mesh may include a layer or multiple layers of the graphene 45 between a lower metal plate 41 and an upper metal plate 42.

For example, as illustrated in FIG. 7A and FIG. 7B, in the gate electrode 40, the graphene 45 may be arranged on the lower metal plate 41 formed into a hole or a mesh and the upper metal plate 42 formed corresponding to the lower metal plate 41 may be arranged on the graphene 45, and then, the lower metal plate 41 and the upper metal plate 42 may be stably fixed by clamping or welding. Herein, the upper metal plate 42 functions to more stably and firmly support the graphene 45 bonded to the lower metal plate 41.

Therefore, since the graphene 45 is transferred onto the metal plate 41a generally functioning as a gate electrode and the metal plate 41a is disposed as turned upside down, the gate electrode 40 used in the X-ray source according to an embodiment of the present disclosure can allow electron beams to pass through toward the anode electrode 30 at very high transmittance. Further, an electron beam focusing effect can be obtained with the graphene 45, and, thus, the number of focusing lens 50 included in the X-ray source can be reduced or removed.

The getter 70 functions to collect a generated gas and includes an evaporable getter or a non-evaporable getter. The evaporable getter may be manufactured using barium (Ba), barium-aluminum-nickel alloy (Ba—Al—Ni alloy), alkali metals, and the non-evaporable getter may be manufactured using zirconium (Zr), titanium (Ti), nickel (Ni), or various alloys based on these materials.

Hereinafter, a method of manufacturing a carbon nanotube electron emitter of the present disclosure will be described in detail.

Figure 8:
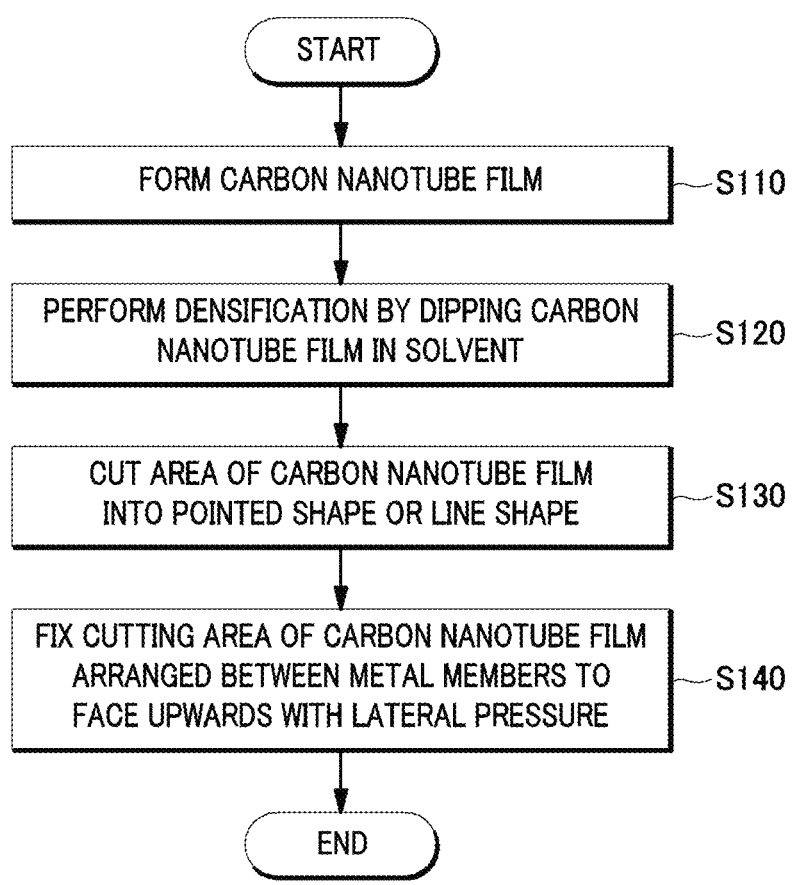
FIG. 8 is a flowchart provided to elaborate a method of manufacturing a carbon nanotube electron emitter in accordance with various embodiments described herein.

FIG. 8 is a flowchart provided to elaborate a method of manufacturing a carbon nanotube electron emitter in accordance with an embodiment of the present disclosure.

Figure 9:
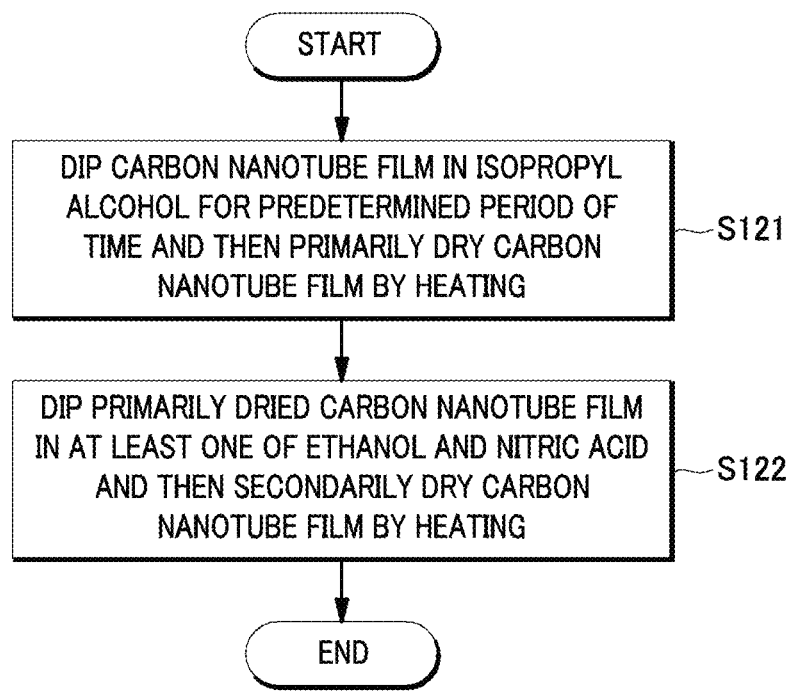
FIG. 9 is a flowchart provided to elaborate densification of a carbon nanotube film of the carbon nanotube electron emitter illustrated in FIG. 8.

FIG. 9 is a flowchart provided to elaborate densification of a carbon nanotube film of the carbon nanotube electron emitter illustrated in FIG. 8.

Figure 10:
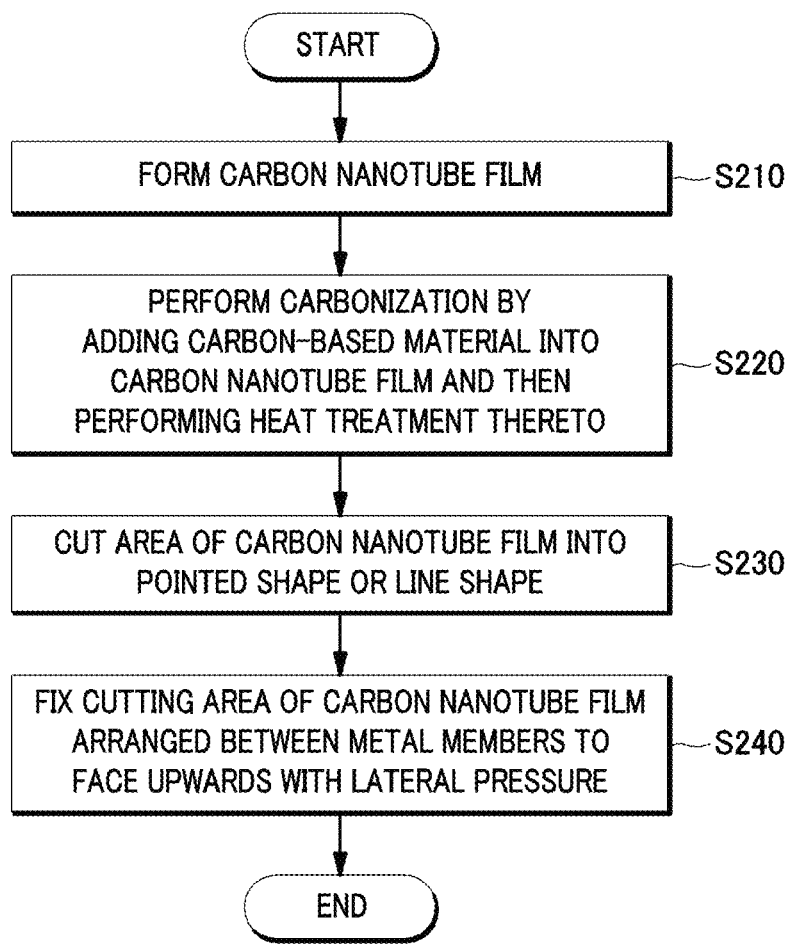
FIG. 10 is a flowchart provided to elaborate a method of manufacturing a carbon nanotube electron emitter in accordance with various embodiments described herein.

FIG. 10 is a flowchart provided to elaborate a method of manufacturing a carbon nanotube electron emitter in accordance with another embodiment of the present disclosure.

Figure 11:
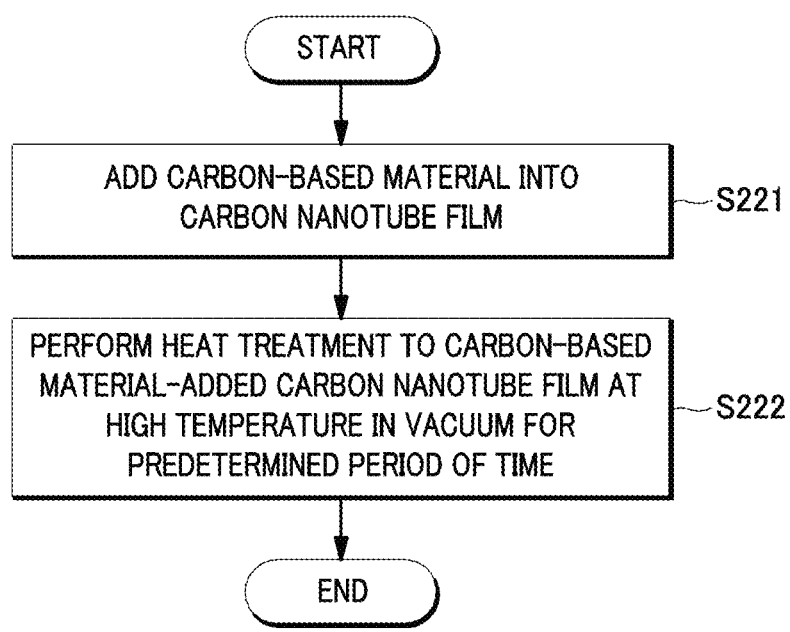
FIG. 11 is a flowchart provided to elaborate carbonization of a carbon nanotube film of the carbon nanotube electron emitter illustrated in FIG. 10.

FIG. 11 is a flowchart provided to elaborate carbonization of a carbon nanotube film of the carbon nanotube electron emitter illustrated in FIG. 10.

Referring to FIG. 9, a method of manufacturing a carbon nanotube electron emitter of the present disclosure includes: forming the carbon nanotube film 110 (S110); performing densification by dipping the carbon nanotube film 110 in a solvent (S120); cutting an area of the carbon nanotube film 110 into a pointed shape or a line shape (S130); and fixing the cutting area of the carbon nanotube film 110 arranged between the at least two metal members 120 to face upwards with lateral pressure (S140). Herein, the process (S130) of cutting the carbon nanotube film 110 may be performed before the densification process (S120).

Herein, the solvent may include at least any one of isopropyl alcohol (IPA), ethanol, and nitric acid.

Specifically, referring to FIG. 2A to FIG. 2C, the process (S110) of forming the carbon nanotube film 110 may include mixing distilled water, sodium dodecyl sulfate (SDS), and carbon nanotubes (CNTs) and dispersing the mixed solution and filtering the mixed solution through an anodic aluminum oxide membrane (AAO membrane) and drying it in the form of a film. Herein, the carbon nanotubes CNTs are single-walled CNTs (SWCNTs) or multiwalled CNTs (MWCNTs).

For example, in the process S110, SDS (e.g., 200 mg) and CNTs (e.g., 4 mg) are mixed in distilled water (e.g., 200 ml) and the mixed solution is dispersed by ultrasonication for about 65 minutes and then centrifuged for about 40 minutes. Then, the mixed solution is filtered through the AAO membrane 111 to allow only the distilled water to pass through, and, thus, the CNTs are filtered and gathered on the AAO membrane 111. In this case, the CNTs are strongly entangled with each other by van der Waals force, and then, the AAO membrane 111 is removed using a sodium hydroxide solution—to form the carbon nanotube film 110.

Specifically, referring to FIG. 9, the densification process (S120) includes dipping the carbon nanotube film 110 in isopropyl alcohol (IPA) for a predetermined period of time and then primarily drying the carbon nanotube film 110 by heating (S121) and dipping the primarily dried carbon nanotube film 110 in at least one of ethanol and nitric acid and then secondarily drying the carbon nanotube film 110 by heating (S122).

For example, in the process S121, the carbon nanotube film 110 is dipped in isopropyl alcohol (IPA) for about 24 hours and taken out and then dried in an oven at a temperature of about 80° C. for about 10 minutes. In this case, the SDS between carbon nanotubes in the dried carbon nanotube film 110 can be removed as much as possible. In the process S122, the dried carbon nanotube film 110 is dipped in ethanol or nitric acid whose temperature is increased to about 80° C. for 1 hour to 2 hours and taken out and then dried in an oven. Thus, as illustrated in FIG. 2, a space between carbon nanotubes is reduced. Therefore, the carbon nanotubes are more strongly and densely entangled, forming a network than those in the carbon nanotube film 110 before the process S120, and bonding strength between the carbon nanotubes is increased.

Referring to FIG. 10, the method of manufacturing a carbon nanotube electron emitter according to the present disclosure may further include performing carbonization by adding a carbon-based material into the carbon nanotube film and then performing heat treatment thereto (S220) before or after the densification process (S120). Herein, the carbon-based material includes at least one of graphite adhesive, carbon paste, and carbon nanotube (CNT) paste.

Referring to FIG. 11, specifically, the carbonization process S220 includes adding the carbon-based material into the carbon nanotube film (S221) and performing heat treatment to the carbon-based material-added carbon nanotube film at a high temperature in a vacuum for a predetermined period of time (S222).

For example, in the process S221, the carbon-based material is added into the carbon nanotube film 110. Herein, the carbon-based material may be in liquid form or solid form. In the process S222, if heat treatment is performed to the carbon nanotube film 110 at a high temperature of about 900° C. in a vacuum for about 1 hour, the carbon-based material is filled and solidified in an empty space between carbon nanotubes forming a network. That is, bonding strength between the carbon nanotubes is increased as compared with the carbon nanotube film 110 before the process S120.

That is, in the carbon nanotube film 110 in which bonding strength between carbon nanotubes is improved by the densification process S120 and the carbonization process 220, it is possible to suppress disentanglement or separation of carbon nanotubes even in harsh conditions. Accordingly, it is possible to suppress damage to the carbon nanotube electron emitter 10 in a performance limit test.

Hereinafter, a method of manufacturing a carbon nanotube electron emitter according to another embodiment of the present disclosure will be described. An explanation of components that perform the same functions as the respective components described above will not be provided.

Referring to FIG. 10, a method of manufacturing a carbon nanotube electron emitter includes: forming the carbon nanotube film 110 (S210); performing carbonization by adding a carbon-based material into the carbon nanotube film 110 and then performing heat treatment thereto (S220); cutting an area of the carbon nanotube film 110 into a pointed shape or a line shape (S230); and fixing the cutting area of the carbon nanotube film 110 arranged between the at least two metal members 120 to face upwards with lateral pressure (S240).

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

10: carbon nanotube electron emitter
20: Cathode electrode
30: Anode electrode
40: Gate electrode
41: Lower metal plate
42: Upper metal plate
45: Graphene
50: Focusing lens
60: Window
70: Getter
110: Carbon nanotube film
111: Anodic aluminum oxide membrane
120: Metal member

We claim:

1. A method of manufacturing a carbon nanotube electron emitter, comprising:
   forming a carbon nanotube film;
   performing densification by dipping the carbon nanotube film in a solvent;
   cutting an area of the carbon nanotube film into a pointed shape or a line shape; and
   fixing the cutting area of the carbon nanotube film arranged between at least two metal members to face upwards with lateral pressure.

2. The method of manufacturing a carbon nanotube electron emitter of claim 1,
   wherein the forming of the carbon nanotube film includes:
   mixing distilled water, sodium dodecyl sulfate (SDS), and carbon nanotubes (CNTs) and dispersing the mixed solution; and
   filtering the mixed solution through an anodic aluminum oxide membrane (AAO membrane) and drying it in the form of a film, and
   the carbon nanotubes CNTs are single-walled CNTs (SW-CNTs) or multiwalled CNTs (MWCNTs).

3. The method of manufacturing a carbon nanotube electron emitter of claim 1,
   wherein the solvent includes at least any one of isopropyl alcohol (IPA), ethanol, and nitric acid, and
   the densification includes:
   dipping the carbon nanotube film in the IPA for a predetermined period of time and then primarily drying the carbon nanotube film by heating; and
   dipping the primarily dried carbon nanotube film in at least one of the ethanol and the nitric acid and then secondarily drying the carbon nanotube film by heating.

4. The method of manufacturing a carbon nanotube electron emitter of claim 1, further comprising:
   before or after the densification,
   performing carbonization by adding a carbon-based material into the carbon nanotube film and then performing heat treatment thereto.

5. The method of manufacturing a carbon nanotube electron emitter of claim 4,
   wherein the carbon-based material includes at least one of graphite adhesive, carbon paste, and carbon nanotube (CNT) paste, and
   the carbonization includes:
   adding the carbon-based material into the carbon nanotube film; and
   performing heat treatment to the carbon-based material-added carbon nanotube film at a high temperature in a vacuum for a predetermined period of time.

6. A method of manufacturing a carbon nanotube electron emitter, comprising:
   forming a carbon nanotube film;
   cutting an area of the carbon nanotube film into a pointed shape or a line shape;
   performing densification by dipping the cut carbon nanotube film in a solvent; and
   fixing the cutting area of the carbon nanotube film arranged between at least two metal members to face upwards with lateral pressure.

7. A method of manufacturing a carbon nanotube electron emitter, comprising:
   forming a carbon nanotube film;
   performing carbonization by adding a carbon-based material into the carbon nanotube film and then performing heat treatment thereto;
   cutting an area of the carbon nanotube film into a pointed shape or a line shape; and
   fixing the cutting area of the carbon nanotube film arranged between at least two metal members to face upwards with lateral pressure.

8. A carbon nanotube electron emitter, comprising:
a carbon nanotube film which is densified with a solvent or carbonized by adding a carbon-based material; and
at least two metal members arranged on respective sides of the carbon nanotube film and fixing the carbon nanotube film,
wherein an area of the carbon nanotube film is cut into a pointed shape or a line shape, and
wherein the metal members fix the cutting area of the carbon nanotube film to face upwards with lateral pressure.

9. The carbon nanotube electron emitter of claim 8,
wherein in the carbon nanotube electron emitter,
multiple carbon nanotube films are arranged in an array type and the metal member is arranged between the carbon nanotube films.

10. The carbon nanotube electron emitter of claim 8,
wherein the solvent includes at least any one of isopropyl alcohol (IPA), ethanol, and nitric acid, and the densified carbon nanotube film is dipped in the solvent and then dried, and in the densified carbon nanotube film, a space between carbon nanotubes is reduced by removing sodium dodecyl sulfate (SDS) remaining between the carbon nanotubes, and, thus, bonding strength between the carbon nanotubes is increased.

11. The carbon nanotube electron emitter of claim 8,
wherein the carbon-based material includes at least one of graphite adhesive, carbon paste, and carbon nanotube (CNT) paste, and
the carbonized carbon nanotube film is prepared by performing heat treatment to the carbon-based material-added carbon nanotube film at a high temperature in a vacuum for a predetermined period of time, and in the carbonized carbon nanotube film, the added carbon-based material fills a space between carbon nanotubes, and, thus, bonding strength between the carbon nanotubes is increased.

\* \* \* \* \*